Dec. 30, 1930.         C. C. JONES         1,786,910
TESTING INSTRUMENT FOR ELECTRICAL CONDENSERS
Filed April 1, 1929
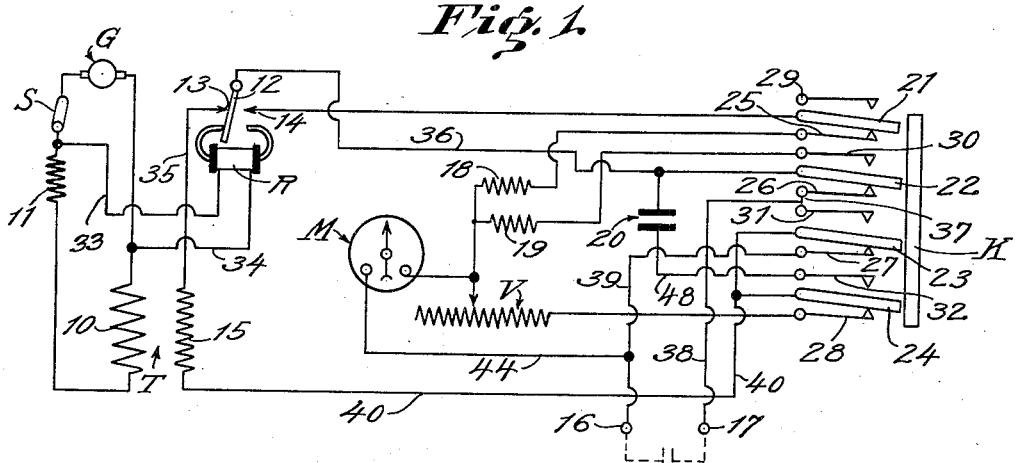
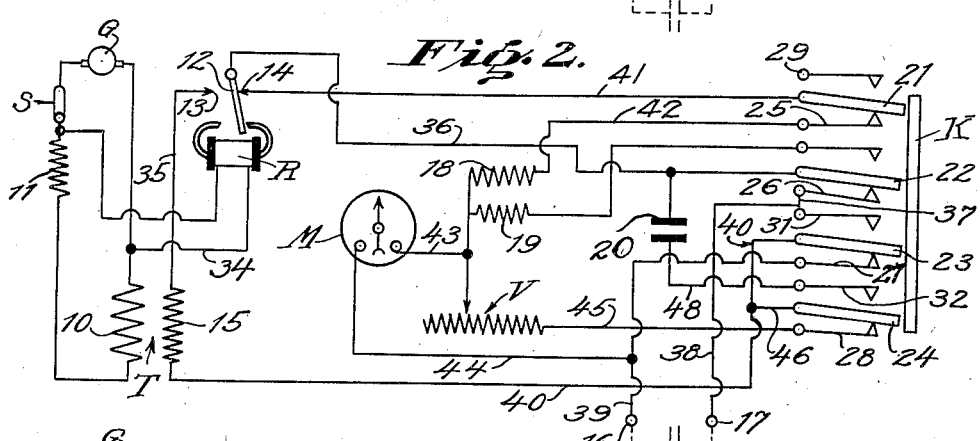
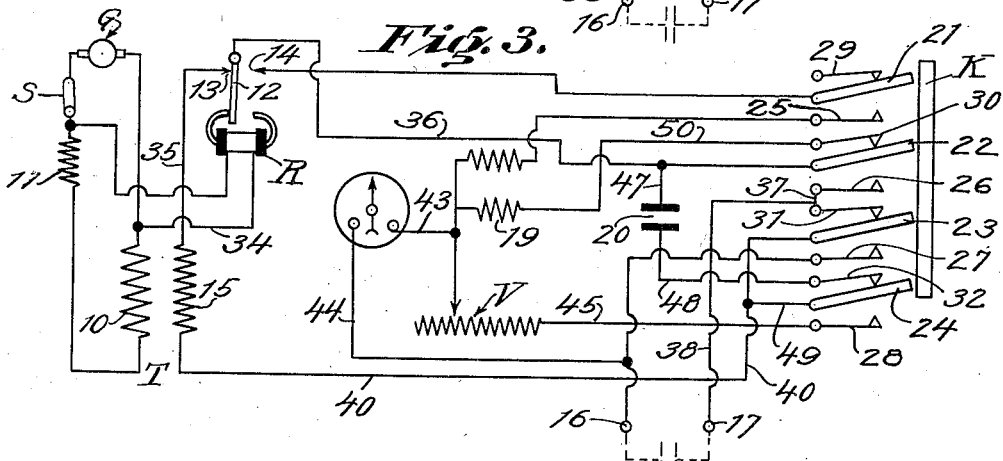
Inventor
Charles C. Jones
By Munn & Co
Attorney Patented Dec. 30, 1930

1,786,910

UNITED STATES PATENT OFFICE

CHARLES C. JONES, OF PHOENIX, ARIZONA

TESTING INSTRUMENT FOR ELECTRICAL CONDENSERS

Application filed April 1, 1929. Serial No. 351,734.

My invention relates to an instrument particularly adapted, although not necessarily, for use in testing electrical condensers such as are used in the art of radio and in automobile ignition systems.

It is a purpose of my invention to provide a testing instrument by which electrical condensers can be tested for capacity, leakage and "shorts," all in such manner that an accurate indication can be obtained of a condenser's condition without the necessity of any computation or comparison with a standard condenser, thus providing a practical instrument which can be readily used by the layman with the utmost ease and dispatch to obtain a direct reading of a condenser's condition.

It is a further purpose of my invention to provide an instrument of the above described character by which an accurate reading of leakage of a condenser can be obtained regardless of the small amount of leakage present, and which will in no way be damaged in the event that an attempt is made to obtain a capacity reading on a shorted condenser.

I will describe only one form of testing instrument for electrical condensers embodying my invention and will then point out the novel features thereof in claims.

In the accompanying drawing,

Figs. 1 and 2 are diagrammatic views illustrating one form of testing instrument embodying my invention as used for testing a condenser for capacity, and Fig. 3 is a diagrammatic view illustrating the instrument as used for testing a condenser for leakage.

Referring specifically to the drawings in which similar reference characters designate similar parts in each of the several views, my invention in its present embodiment comprises a polarized relay R which is energized from a suitable source of alternating current supply of preferably 110 volts, such as a generator G for example; and in circuit with which latter is the primary 10 of a transformer T for stepping up the voltage to approximately 250 volts. Also included in circuit with the generator G is a master switch S and a resistor 11 for limiting the current flow to approximately 100 watts.

The relay R is provided with an armature 12 which alternately engages contacts 13 and 14 included in a circuit in which is also interposed the secondary 15 of the transformer T and a pair of spaced apart terminals 16 and 17 across which a condenser indicated in broken lines in the drawing, to be tested, is adapted to be connected.

A direct current galvanometer M is included in a second circuit; and a variable resistance V is provided for varying the range of capacity indicated by the galvanometer. Resistors 18 and 19 are also provided to protect the windings of the galvanometer against damage, the resistor 18 being approximately .025 megohms to protect the galvanometer when testing a condenser for capacity, and the resistor 19 being of such value that a direct "short" across the terminals 16 and 17 will give slightly less than a full dial reading on the galvanometer when testing for leakage, it being found in practice that about 1 megohm is sufficient for the resistor 19.

A fixed condenser 20 preferably of about 1 microfarad capacity is included in a third circuit and is utilized as a source of direct current when testing a condenser for leakage. A circuit controller designated generally at K is provided for controlling the circuits in which the polarized relay R, variable resistance V, galvanometer M, resistors 18 and 19, and condenser 20 are interposed, and in the present instance the circuit controller is in the form of a four pole double throw switch having four movable contact arms 21, 22, 23 and 24 capable of respectively engaging stationary contacts 25, 26, 27 and 28, or stationary contacts 29, 30, 31 and 32, according as the switch is moved to the extreme position shown in Figures 1 and 2 to test a condenser for capacity, or the other extreme position shown in Figure 3 to test a condenser for leakage.

The operation of the instrument is as follows:

Let it be assumed that a condenser is to be tested for capacity and is connected across the terminals 16 and 17 as shown in broken lines in the drawing. With the circuit controller K occupying the position shown in Figures 1 and 2 and the master switch S closed, the armature 12 of the relay R will vibrate in synchronism with the alternating current from the generator G, and will alternately engage the contacts 13 and 14; current being supplied to the relay through conductors 33 and 34 connected to opposite sides of the line.

During the interval in which current is flowing in one direction, the armature 12 will engage the contact 13 as shown in Fig. 1 so that current will flow from one side of the transformer secondary 15 to complete a circuit through a conductor 35, contact 13, armature 12, a conductor 36, contact arm 22, contact 26, a conductor 37 bridging the contacts 26 and 31, conductor 38 to the terminal 17, thence through the condenser under test, terminal 16, a conductor 39, contact 27, contact arm 23 and thence through a conductor 40 to the other side of the transformer secondary 15, thus causing the condenser under test to be charged from the transformer T.

Upon a reversal of the direction of current flow and under which condition the armature 12 of the relay R will engage the contact 14 as shown in Figure 2, current stored in the condenser under test will discharge therefrom through terminal 17, conductor 38, conductor 37, contact 26, contact arm 22, conductor 36, armature 12 of the relay R, contact 14, a conductor 41, contact arm 21, contact 25, a conductor 42, and resistor 18, after which the current is divided between the galvanometer M and the variable resistance V; that portion of the current to the galvanometer passing through a conductor 43 leading to one side of the galvanometer from the variable resistance, thence through the windings of the galvanometer, a conductor 44, conductor 39, terminal 16 to the condenser under test; while that portion of the current flowing through the variable resistance V reaches the terminal 16 from the resistance through a conductor 45, contact 28, contact arm 24, a conductor 46, conductor 40, contact arm 23, contact 27 and conductor 39. It will be clear that as the galvanometer is excluded from the circuit when the condenser under test is being charged and is included in the circuit in parallel with the variable resistance V during discharging of the condenser under test, that the capacity of the latter indicated by the galvanometer with the resistance V on any given tap, will be directly proportionate to the capacity at the condenser under test, thus producing a direct reading in microfarads on the galvanometer.

Let it now be assumed that it is desired to test a condenser for leakage and that the circuit controller K has been moved to the position shown in Fig. 3. With a condenser to be tested connected across the terminals 16 and 17 as shown in this figure, and during the interval in which the armature 12 is engaging the contact 13 as also shown in this figure, current will flow from one side of the transformer secondary 15 to complete a circuit through conductor 35, contact 13, armature 12, conductor 36, a conductor 47, condenser 20, a conductor 48, contact 32, contact arms 24, a conductor 49, and conductor 40 to the other side of the transformer secondary 15, thus charging the condenser 20. Current will also flow from conductor 36 to complete a circuit through contact arm 22, contact 30, a conductor 50, resistor 19, conductor 43 to the galvanometer M; and from the galvanometer through conductor 44, conductor 39, terminal 16, condenser under test, terminal 17, conductor 38, conductor 37, contact 31, contact arm 23, and conductor 40 to said other side of the transformer secondary 15.

As the condenser under test is connected in the circuit in parallel with the condenser 20 through the galvanometer, any leakage present in the condenser under test will be indicated by the galvanometer and can be read directly on the latter in megohms. A perfect condenser will give no indication on the galvanometer other than that caused by displacement current charging the condenser 20 when the master switch S is first closed.

It will be clear that the relay R serves the dual purpose of rectifying the alternating line current and of charging and discharging the condenser under test as well as the condenser 20, and that the latter is utilized as the source of direct current when testing a condenser for leakage. Furthermore if the instrument is set to test for capacity and the condenser under test happens to be shorted, no reading will be obtained and the instrument remain undamaged.

Although I have herein shown and described only one form of testing instrument for electrical condensers embodying my invention, it is to be understood that various changes and modifications may be made therein without departing from the spirit of the invention and the spirit and scope of the appended claims.

I claim:

1. A testing instrument of the character described comprising a circuit including a source of alternating current supply, means for limiting the current flow in said circuit to a predetermined wattage, a step up transformer having the primary thereof included in said circuit, a second circuit including the secondary of the transformer and terminals across which a condenser to be tested is adapted to be connected, a polarized relay in the second circuit for causing the condenser under test to be charged and discharged with each cycle of current from said source, and a galvanometer so included in parallel in said circuit when the condenser under test is being discharged, as to indicate the capacity of the condenser.

2. A testing instrument of the character described comprising a circuit including a source of alternating current supply, means for limiting the current flow in said circuit to a predetermined wattage, a step up transformer having the primary thereof included in said circuit, a second circuit including the secondary of the transformer and terminals across which a condenser to be tested is adapted to be connected, a polarized relay in the second circuit for causing the condenser under test to be charged and discharged with each cycle of current from said source, a third circuit including a direct current galvanometer, a fourth circuit including a condenser for charging the condenser under test, and a circuit controller for said circuits, by which the galvanometer can be so included in the second circuit that when the condenser under test is being discharged, its capacity will be indicated by the galvanometer, or the galvanometer so included in the second circuit with said charging condenser, as to cause the galvanometer to indicate any leakage present in the condenser under test.

3. A testing instrument comprising a circuit including a source of current supply and a pair of terminals across which a condenser to be tested is adapted to be connected, means in said circuit for alternately charging and discharging the condenser under test, a galvanometer, and other circuits including a circuit controller by which the galvanometer can be so included in the first circuit as to indicate the capacity of the condenser under test when discharging, or the galvanometer so included in the first circuit with the condenser under test as to indicate any leakage present in the condenser under test when being charged.

4. A testing instrument of the character described comprising a circuit including a source of current supply and terminals across which a condenser to be tested is adapted to be connected, means in said circuit for causing the condenser under test to be alternately charged and discharged, a galvanometer, a source of direct current supply, and means by which the galvanometer can be either so connected in the circuit as to indicate the capacity of the condenser under test when discharging, or so connected in the circuit with the condenser under test and said source of direct current supply as to indicate any leakage present in the condenser under test when being charged.

5. A testing instrument of the character described comprising a circuit including a source of current supply and terminals across which a condenser to be tested is adapted to be connected, means in said circuit for causing the condenser under test to be alternately charged and discharged, a galvanometer, a source of direct current supply, and means by which the galvanometer can be either connected in parallel with said circuit in a manner to indicate the capacity of the condenser under test, or the galvanometer and condenser under test connected in series and in parallel with the source of direct current, in a manner to cause the galvanometer to indicate any leakage present in the condenser under test.

6. A testing instrument of the character described comprising a circuit including a source of alternating current supply and terminals across which a condenser to be tested is adapted to be connected, a polarized relay in said circuit for causing the condenser under test to be charged and discharged with each cycle of current from the source of supply, a second circuit including a direct current galvanometer, a third circuit including a charging condenser for the condenser under test, and a circuit controller by which the second circuit can be so included in the first circuit as to cause the galvanometer to indicate the capacity of the condenser under test when discharging, or the second and third circuits so included in the first circuit as to cause the galvanometer to indicate any leakage present in the condenser.

7. A testing instrument of the character described comprising a circuit including a source of alternating current supply and terminals across which a condenser to be tested is adapted to be connected, a polarized relay in said circuit for causing the condenser under test to be charged and discharged with each cycle of current from the source of supply, a second circuit including a direct current galvanometer, a third circuit including a charging condenser for the condenser under test, and a circuit controller by which the second circuit can be so included in parallel in the first circuit as to cause the galvanometer to indicate the capacity of the condenser under test when discharging, or the second circuit so included in series with the first circuit and the charging condenser in parallel with the galvanometer and the condenser under test, as to cause the galvanometer to indicate any leakage present in the condenser under test.

8. A testing instrument comprising a circuit including a pair of terminals across which a condenser to be tested is adapted to be connected, and a source of current supply for charging the condenser under test, a source of direct current, a direct current galvanometer, and means by which the galvanometer can be so included in the circuit with the condenser under test and said source of direct current as to indicate any leakage present in the condenser under test when being charged.

9. A testing instrument comprising a circuit including a pair of terminals across which a condenser to be tested is adapted to be connected, and a source of current supply for charging the condenser under test, a charging condenser for the condenser under test, and means by which the galvanometer can be so included in the circuit with the condenser under test and the charging condenser, as to indicate any leakage present in the condenser under test when being charged.

CHARLES C. JONES.